US009621905B2

United States Patent
Coban et al.

(10) Patent No.: US 9,621,905 B2
(45) Date of Patent: Apr. 11, 2017

(54) TILES AND WAVEFRONT PARALLEL PROCESSING

(71) Applicant: QUALCOMM Incorporated, San Diego, CA (US)

(72) Inventors: Muhammed Zeyd Coban, Carlsbad, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 13/841,253

(22) Filed: Mar. 15, 2013

(65) Prior Publication Data
US 2014/0003531 A1    Jan. 2, 2014

Related U.S. Application Data

(60) Provisional application No. 61/666,617, filed on Jun. 29, 2012.

(51) Int. Cl.
*H04N 19/174* (2014.01)
*H04N 19/176* (2014.01)
(Continued)

(52) U.S. Cl.
CPC ......... *H04N 19/174* (2014.11); *H04N 19/176* (2014.11); *H04N 19/436* (2014.11);
(Continued)

(58) Field of Classification Search
CPC .......................... H04N 19/174; H04N 19/176
See application file for complete search history.

(56) References Cited

U.S. PATENT DOCUMENTS

| | | |
|---|---|---|
| 6,473,465 B1 | 10/2002 | Takahashi |
| 6,963,608 B1 | 11/2005 | Wu |

(Continued)

FOREIGN PATENT DOCUMENTS

| | | |
|---|---|---|
| TW | 521526 B | 2/2003 |
| TW | 200616457 | 5/2006 |

(Continued)

OTHER PUBLICATIONS

F. Bossen, B. Bross, K. Suhring, & D. Flynn, "HEV Complexity and Implementation Analysis", 22 IEEE Transactions on Circuits & Sys. for Video Tech. 1685--1696 (Oct. 2012).*

(Continued)

*Primary Examiner* — David N Werner
(74) *Attorney, Agent, or Firm* — Shumaker & Sieffert, P.A.

(57) ABSTRACT

This disclosure describes techniques that may enable a video coder to simultaneously implement multiple parallel processing mechanisms, including two or more of wavefront parallel processing (WPP), tiles, and entropy slices. This disclosure describes signaling techniques that are compatible both with coding standards that only allow one parallel processing mechanism to be implemented at a time, but that are also compatible with potential future coding standards that may allow for more than one parallel processing mechanism to be implemented simultaneously. This disclosure also describes restrictions that may enable WPP and tiles to be implemented simultaneously.

30 Claims, 8 Drawing Sheets

(51) Int. Cl.
*H04N 19/70* (2014.01)
*H04N 19/436* (2014.01)
*H04N 19/46* (2014.01)
*H04N 19/61* (2014.01)

(52) U.S. Cl.
CPC ............ *H04N 19/70* (2014.11); *H04N 19/46* (2014.11); *H04N 19/61* (2014.11)

(56) References Cited

U.S. PATENT DOCUMENTS

| | | | |
|---|---|---|---|
| 7,158,571 B2 | 1/2007 | Wang et al. | |
| 7,227,589 B1 | 6/2007 | Yeo et al. | |
| 7,336,720 B2 | 2/2008 | Martemyanov et al. | |
| 8,165,198 B2 | 4/2012 | Tseng et al. | |
| 8,315,466 B2 | 11/2012 | El-Maleh et al. | |
| 2012/0163457 A1 | 6/2012 | Wahadaniah et al. | |
| 2012/0183074 A1 | 7/2012 | Fuldseth | |
| 2012/0328003 A1* | 12/2012 | Chien ................... | H04N 19/176 375/240.03 |
| 2013/0022119 A1* | 1/2013 | Chien ................... | H04N 19/159 375/240.16 |
| 2013/0036399 A1* | 2/2013 | Anderson ............ | G06F 17/3089 717/100 |
| 2013/0101034 A1* | 4/2013 | Wahadaniah .......... | H04N 19/70 375/240.12 |
| 2013/0101035 A1* | 4/2013 | Wang ..................... | H04N 19/70 375/240.12 |
| 2013/0107952 A1* | 5/2013 | Coban ................... | H04N 19/105 375/240.12 |
| 2013/0114735 A1* | 5/2013 | Wang ................... | H04N 19/176 375/240.23 |
| 2013/0114736 A1* | 5/2013 | Wang ................... | H04N 19/176 375/240.24 |
| 2013/0182774 A1* | 7/2013 | Wang ..................... | H04N 19/46 375/240.24 |
| 2013/0182775 A1* | 7/2013 | Wang ..................... | H04N 19/46 375/240.24 |
| 2014/0079126 A1* | 3/2014 | Ye ..................... | H04N 19/00763 375/240.16 |
| 2014/0086305 A1* | 3/2014 | Esenlik .............. | H04N 7/26244 375/240.02 |
| 2014/0086306 A1* | 3/2014 | Esenlik .................. | H04N 19/46 375/240.02 |
| 2014/0140414 A1* | 5/2014 | Deshpande .......... | H04N 19/597 375/240.25 |
| 2014/0192894 A1* | 7/2014 | Deshpande ............ | H04N 19/70 375/240.25 |
| 2014/0328411 A1* | 11/2014 | Jeong ..................... | H04N 19/70 375/240.26 |
| 2014/0334557 A1* | 11/2014 | Schierl ................... | H04N 19/91 375/240.27 |
| 2015/0023409 A1* | 1/2015 | Schierl ................... | H04N 19/70 375/240.02 |
| 2015/0181218 A1* | 6/2015 | Okawa ................. | H04N 19/513 375/240.16 |
| 2015/0341656 A1* | 11/2015 | Seregin ................ | H04N 19/105 375/240.12 |
| 2015/0350652 A1* | 12/2015 | Nellore .................. | H04N 19/13 375/240.02 |
| 2016/0014415 A1* | 1/2016 | Wu ....................... | H04N 19/103 375/240.24 |
| 2016/0105682 A1* | 4/2016 | Rapaka .................. | H04N 19/44 375/240.12 |
| 2016/0142740 A1* | 5/2016 | Sharman ................ | H04N 19/91 375/240.12 |
| 2016/0156914 A1* | 6/2016 | Suehring ................ | H04N 19/70 375/240.12 |
| 2016/0165248 A1* | 6/2016 | Lainema ................ | H04N 19/70 375/240.08 |
| 2016/0234498 A1* | 8/2016 | Misra ..................... | H04N 19/46 |
| 2016/0241850 A1* | 8/2016 | Deshpande ............ | H04N 19/70 |
| 2016/0301712 A1* | 10/2016 | Shulman ............. | H04L 63/1416 |
| 2016/0323591 A1* | 11/2016 | Chuang ................ | H04N 19/197 |
| 2016/0330459 A1* | 11/2016 | Choi ..................... | H04N 19/597 |

FOREIGN PATENT DOCUMENTS

| | | |
|---|---|---|
| TW | 200920139 A | 5/2009 |
| WO | 2008079960 | 7/2008 |

OTHER PUBLICATIONS

Alvarez-Mesa, et al., "Parallel video decoding in the emerging HEVC standard", IEEE International Conference on Acoustics, Speech and Signal Processing (ICASSP), Mar. 25, 2012-Mar. 30, 2012, pp. 1545-1548, XP032227426, DOI: 10.1109/ICASSP.2012, ISBN: 978-1-4673-0045-2, http://iphome.hhi.de/schierl/assets/hevc_icassp2012.pdf.

Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, pp. 290.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Pourazad, et al., "HEVC: The New Gold Standard for Video Compression", IEEE Consumer Electronics Magazine, Jul. 2012, pp. 36-46.

Sullivan, et al., "Meeting report of the ninth meeting of the Joint Collaborative Team on Video Coding (JCT-VC), Geneva, CH, Apr. 27-May 7, 2012" Joint Collaborative Team on Video Coding (JCT-VC) of ITU-T SG16 WP3 and ISO/IEC JTC1/SC29/WG11 9th Meeting: Geneva, CH, Document JCTVC-I_Notes_d9, 166 pp.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].

(56) References Cited

OTHER PUBLICATIONS

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

International Preliminary Report on Patentability from International Application No. PCT/US2013/048707, dated Jun. 22, 2015, 7 pp.

Bross, et al., "WD5: Working Draft 5 of High-Efficiency Video Coding", JCT-VC meeting; MPEG meeting; Feb. 1, 2012-Feb. 10, 2012; San Jose; (Joint Collaborative Team on Video Coding of ISO/IEC JTC1/SC29/WG11 and ITU-T SG.16 ), Feb. 9, 2012, XP55117607, 213 pp. [uploaded in parts].

Coban, et al., "AHG4: On tiles and wavefronts", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/ No. JCTVC-J0123, 6 pp.

International Search Report and Written Opinion from International Application No. PCT/US2013/048707, dated May 21, 2014, 20 pp.

Jeong, et al., "Syntax on entropy slice information", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0138, XP030111901, 4 pp.

Lee, et al., "Simplification on tiles and slices", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.1tu.int/av-arch/jctvc-site/, No. JCTVC-H0348, XP030111375, 10 pp.

Invitation to pay additional fees from International Application No. PCT/US2013/048707, dated Mar. 4, 2014, 7 pp.

Sasai, et al., "Constrained Tile for parallel decoding", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H0345r1, XP030111372, 4 pp.

Sullivan, et al., "Meeting Report of the 8th JCT-VC Meeting", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H1000, XP030111766, 233 pp. [uploaded in parts].

Wan, et al., "AHG4: Specifying entry points to facilitate different decoder implementations", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-I0237, 4 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Response to Invitation to Pay Additional Fees dated Mar. 4, 2014, from International Application No. PCT/US2013/048707, filed on Mar. 20, 2014, 2 pp.

Response to Written Opinion dated May 21, 2014, from International Application No. PCT/US2013/048707, filed on Aug. 20, 2014, 5 pp.

Second Written Opinion from International Application No. PCT/US2013/048707, dated Oct. 30, 2014, 7 pp.

Response to Second Written Opinion dated Oct. 30, 2014, from International Application No. PCT/US2013/048707, filed on Dec. 30, 2014, 26 pp.

Third Written Opinion from International Application No. PCT/US2013/048707, dated Mar. 9, 2015, 4 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Response to Third Written Opinion dated Mar. 9, 2015, from International Application No. PCT/US2013/048707, filed on May 8, 2015, 24 pp.

Office Action, and translation thereof, from counterpart Taiwan Application No. 102123359, dated Jul. 29, 2015, 6 pp.

Wang et al., "Text for tiles, WPP and entropy slices," Joint Collaborative Team on Video Coding (JCT-VC) of ITU-T SG16 WP3 and ISO/IEC JTC1/SC29/WG11, 8th Meeting: San Jose, Feb. 1-10, 2012, JCTVC-H0737, 234 pp.

Clare et al., "Wavefront Parallel Processing for HEVC Encoding and decoding," Joint Collaborative Team on Video coding (JCT-VC) of ITU-T SG16 WP3 and ISO/IEC JTC1/SC29/WG11, 6th Meeting: Torino, Jul. 14-22, 2011, JCTVC-F274, 16 pp.

\* cited by examiner

TILES AND WAVEFRONT PARALLEL PROCESSING

This disclosure claims the benefit of U.S. Provisional Application No. 61/666,617 filed 29 Jun. 2012, the entire content of which is incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques that may enable a video coder to simultaneously implement multiple parallel processing mechanisms, including two or more of wavefront parallel processing (WPP), tiles, and entropy slices. This disclosure describes signaling techniques that are compatible both with coding standards that only allow one parallel processing mechanism to be implemented at a time, but that are also compatible with potential future coding standards that may allow for more than one parallel processing mechanism to be implemented simultaneously.

In one example, a method of decoding video data includes receiving a parameter set comprising one or more first bits and one or more second bits, wherein the one or more first bits indicate whether tiles are enabled for a series of video blocks, wherein the one or more second bits are different from the one or more first bits, and wherein the one or more second bits indicate whether wavefront parallel processing (WPP) is enabled for the series of video blocks; and decoding the series of video blocks based on the parameter set.

In another example, a device for decoding video data, the device including means for receiving a parameter set comprising one or more first bits and one or more second bits, wherein the one or more first bits indicate whether tiles are enabled for a series of video blocks, wherein the one or more second bits are different from the one or more first bits, and wherein the one or more second bits indicate whether wavefront parallel processing (WPP) is enabled for the series of video blocks; and, means for decoding the series of video blocks based on the parameter set.

In another example, a device for decoding video data includes means for receiving one or more first bits in a parameter set, wherein the one or more first bits indicate whether tiles are enabled for a series of video blocks; and means for receiving one or more second bits in the parameter set, wherein the one or more second bits are different from the one or more first bits, and wherein the one or more second bits indicate whether wavefront parallel processing (WPP) is enabled for the series of video blocks.

In another example, a computer-readable storage medium stores instructions that when executed by one or more processors cause the one or more processors to receive a parameter set comprising one or more first bits and one or more second bits, wherein the one or more first bits indicate whether tiles are enabled for a series of video blocks, wherein the one or more second bits are different from the one or more first bits, and wherein the one or more second bits indicate whether wavefront parallel processing (WPP) is enabled for the series of video blocks; and, decode the series of video blocks based on the parameter set.

In another example, a method of encoding video data includes generating one or more first bits in a parameter set, wherein the one or more first bits indicate whether tiles are enabled for a series of video blocks; and generating one or more second bits in the parameter set, wherein the one or more second bits are different from the one or more first bits, and wherein the one or more second bits indicate whether wavefront parallel processing (WPP) is enabled for the series of video blocks.

In another example, a device for encoding video data includes a video encoder configured to generate one or more first bits in a parameter set, wherein the one or more first bits indicate whether tiles are enabled for a series of video blocks; and generate one or more second bits in the parameter set, wherein the one or more second bits are different from the one or more first bits, and wherein the one or more second bits indicate whether wavefront parallel processing (WPP) is enabled for the series of video blocks.

In another example, a device for encoding video data includes means for generating one or more first bits in a parameter set, wherein the one or more first bits indicate whether tiles are enabled for a series of video blocks; and means for generating one or more second bits in the parameter set, wherein the one or more second bits are different from the one or more first bits, and wherein the one or more second bits indicate whether wavefront parallel processing (WPP) is enabled for the series of video blocks.

In another example, a computer-readable storage medium stores instructions that when executed by one or more processors cause the one or more processors to generate one or more first bits in a parameter set, wherein the one or more first bits indicate whether tiles are enabled for a series of video blocks; and generate one or more second bits in the parameter set, wherein the one or more second bits are different from the one or more first bits, and wherein the one or more second bits indicate whether wavefront parallel processing (WPP) is enabled for the series of video blocks.

The details of one or more examples are set forth in the accompanying drawings and the description below. Other features, objects, and advantages will be apparent from the description and drawings, and from the claims.

DETAILED DESCRIPTION

Figure 1:
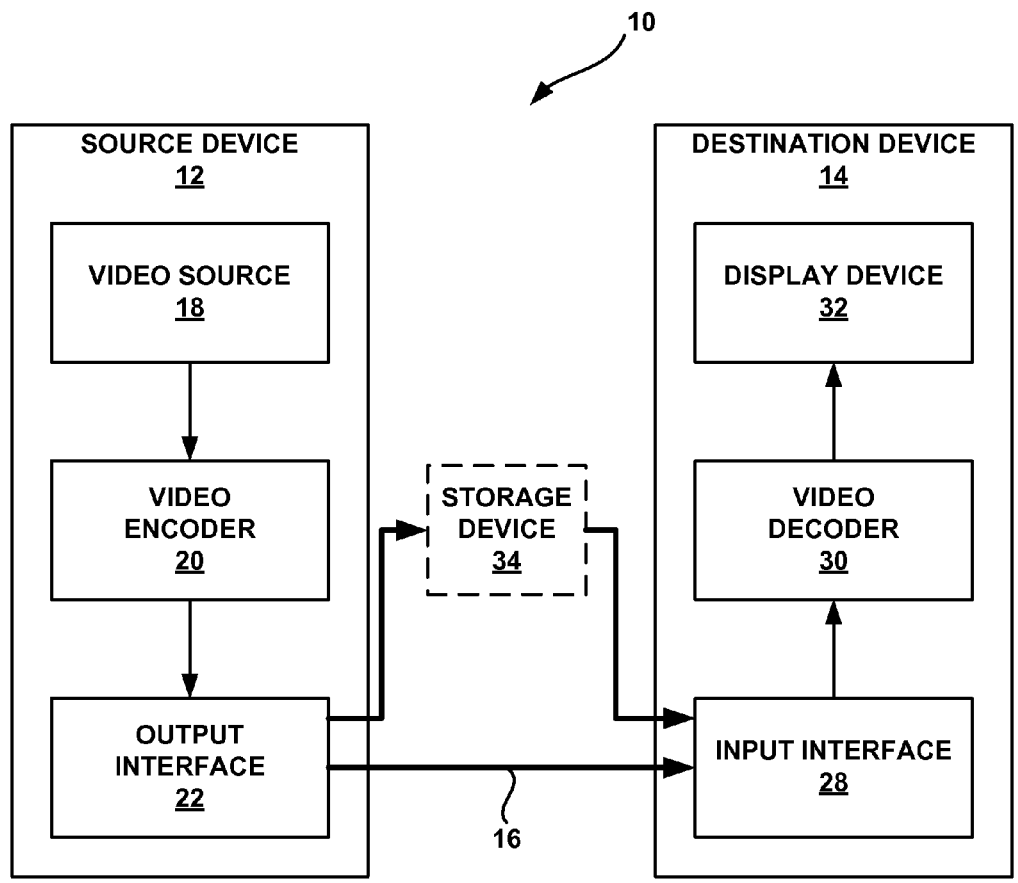
FIG. 1 is a block diagram illustrating an example video encoding and decoding system that may utilize the techniques described in this disclosure.

This disclosure describes design techniques that may allow for the co-existence of multiple parallel processing mechanisms in the newly emerging High-Efficiency Video Coding (HEVC) standard, being developed by the Joint Collaboration Team on Video Coding (JCT-VC) of ITU-T Video Coding Experts Group (VCEG) and ISO/IEC Motion Picture Experts Group (MPEG). Various proposals for HEVC implement several parallel processing mechanisms, including wavefront parallel processing (WPP), tiles, and entropy slices, but these parallel processing mechanisms are generally implemented independently of one another. For example, a series of video blocks may be encoded using one of WPP or tiles but not using both WPP and tiles. This disclosure introduces signaling techniques that can allow for a video coder (e.g. a video encoder or video decoder) to code pictures using WPP, tiles, and entropy slices independently of one another as specified in HEVC while also allowing for the video coder to implement potential future versions and extensions of the HEVC standard that may enable two or more of WPP, tiles, and entropy slices concurrently. As one example, using the techniques of this disclosure, a video coder may be configured to simultaneously implement both tiles and WPP as opposed to only one of tiles and WPP.

When implementing WPP, a video coder (e.g. a video encoder or a video decoder) may partition a picture into a plurality of wavefronts, where each wavefront corresponds to a row of blocks (e.g., largest coding units (LCUs)) of the picture. Throughout this disclosure, wavefronts may also be referred to as WPP substreams, WPP streams, or wavefront substreams. A video coder may code the wavefronts substantially in parallel. For example, the video coder may code a block of a first wavefront of a picture in parallel with a block of a second wavefront of the picture.

In some examples, a video coder may divide the coding unit (CUs) of a slice among smaller groupings referred to as "sub-streams" or "sub-slices." The video coder may divide the CUs of a slice into various types of sub-streams. For example, the video coder may divide the CUs of a slice into a plurality of tiles. The video coder may divide the CUs into tiles by defining two or more horizontal boundaries for a picture and two or more vertical boundaries for the picture. The horizontal boundaries may include the top and bottom edges of the picture. The vertical boundaries may include the left and right sides of the picture. When the video coder does not use tiles, the video coder may encode all of the treeblocks of the frame in raster scan order. However, when the video coder uses tiles, the video coder may code the tiles in raster scan order. When the video coder codes a tile, the video coder may code the treeblocks (i.e., LCUs) within the tile in raster scan order. Thus, the video coder may use tiles to change the encoding order of the treeblocks of the picture.

In HEVC WD 7, the co-existence of tiles, wavefronts, and entropy slices is not allowed. However, this disclosure contemplates that there may be cases where the co-existence of two or more of these mechanisms (e.g. tiles and wavefronts) could potentially improve video coding and could potentially be added to future versions or extensions of HEVC. Accordingly, this disclosure describes signaling techniques to support the coexisting use of multiple parallel processing mechanisms within the HEVC framework. Among the various techniques introduced in this disclosure, this disclosure describes techniques for signaling with one or more first bits in a parameter set for a portion of video data if tiles are enabled for the portion of video data, signaling with one or more second bits if WPP is enabled for the portion of video data, and/or signaling with one or more third bits if entropy slices are enabled for the portion of video data.

These signaling techniques are compatible with HEVC versions that limit the coding of video data to only one parallel processing mechanism (e.g. one of tiles, WPP, and entropy slices), while also enabling future versions and extensions of HEVC to simultaneously enable more than one parallel processing mechanism. Thus, should future versions and extensions of HEVC allow for more than one parallel processing mechanism to be implemented simultaneously, the syntax used to signal tiles, WPP, and entropy slices may not need to be altered, thus reducing the amount of reconfiguring that would be needed to make a video coder compatible with the future version or extension and potentially even making the video coder backwards compatible without the need for reconfiguration.

In the HEVC WD7, the presence of tiles or WPP is signaled in a picture parameter set (PPS). A two bit syntax element is used to identify one of four possible scenarios— 1) WPP is enabled, 2) tiles are enabled, 3) entropy slices are enabled, or 4) none of 1-3 are enabled. To parse or decode multiple tiles or wavefronts, a video decoder may need to determine the locations within a coded slice network abstraction layer (NAL) unit of the encoded syntax elements associated with the wavefronts or tiles. In other words, the video decoder may need to determine the "entry points" of the wavefronts or tiles. For example, the decoder may need to determine where the encoded syntax elements associated with a first wavefront or first tile start, where the encoded syntax elements associated with a second wavefront or tile start, and so on. In WD7, because co-existence of tiles and WPP is not allowed, there exists no ambiguity in the types of entry points signaled in a slice header. If tiles are enabled in the PPS, then a video decoder knows the entry points in the slice header are tile entry points. If WPP is enabled in the PSS, then the video decoder knows the entry points in the slice header are WPP entry points.

In order to efficiently enable the co-existence of tiles and wavefront, this disclosure proposes implementing a restriction that, when WPP and tiles are both enabled, tiles start a new slice (with a slice header). Additionally, this disclosure proposes that if both tiles and WPP are enabled in a picture, then each wavefront is within a tile. If co-existence of tiles and WPP is not present, then these restrictions need not be imposed, and existing techniques may be used. Thus, according to techniques of this disclosure, if both tiles and WPP are enabled in a picture, then wavefronts can be present within tiles without spanning across tiles. The entry points signaled in the slice headers can be the WPP entry points if both tiles and wavefronts co-exist in a picture. If only one of tiles and WPP are enabled in a picture, then the entry points signaled in the slice header can correspond to either tiles or WPP as indicated in the PPS as in the HEVC WD7 specification.

To enable the co-existence of both WPP and tiles, this disclosure further proposes signaling, e.g., in a PPS, that both tiles and WPP are enabled. Such signaling may, for example, include replacing the 2-bit syntax element described above with a 3-bit syntax element that can additionally signal the presence of both WPP and tiles as well as the presence of just tiles or just WPP.

FIG. 1 is a block diagram illustrating an example video encoding and decoding system 10 that may utilize the techniques described in this disclosure. As will be explained in more detail below, system 10 may code (both encode and decode) video blocks simultaneously using multiple parallel processing mechanisms, such as both tiles and WPP. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

System 10 may operate in accordance with different video coding standards. For example, video encoder 20 and video decoder 30 may operate according to a video compression standard, such as the include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A joint draft of the MVC extension has been approved as of January 2012.

In addition, there is a new video coding standard, namely High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). One working draft of HEVC is document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, 27 Apr. 2012 to 7 May 2012. This document is referred to as HEVC WD7, and as of 14 Mar. 2013, is downloadable from http://phenix.int-evey.fr/jct/doc_end_user/documents/9_Geneva/wg11/JCTVC-I1003-v6.zip.

For purposes of description, video encoder 20 and video decoder 30 are described in context of the HEVC or the H.264 standard and the extensions of such standards. The techniques of this disclosure, however, are not limited to any particular coding standard. Other examples of video compression standards include MPEG-2 and ITU-T H.263. Proprietary coding techniques, such as those referred to as On2 VP6/VP7/VP8, may also implement one or more of the techniques described herein.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

This disclosure introduces techniques that allow restricted co-existence of multiple parallel processing mechanisms, such as both tiles and wavefront parallel processing in HEVC. WPP enables the processing of multiple rows of LCUs in parallel in a wavefront fashion where there is a two coding tree blocks (CTBs) delay in between the start of the wavefronts. In WD7, there is a restriction of one wavefront per CTB row, with bitstream entry points to the start of the wavefront substreams being signaled in the slice header, preceding the wavefronts in the same coded slice NAL unit. A CTB is also referred to as a largest coding unit (LCU).

Figure 2:
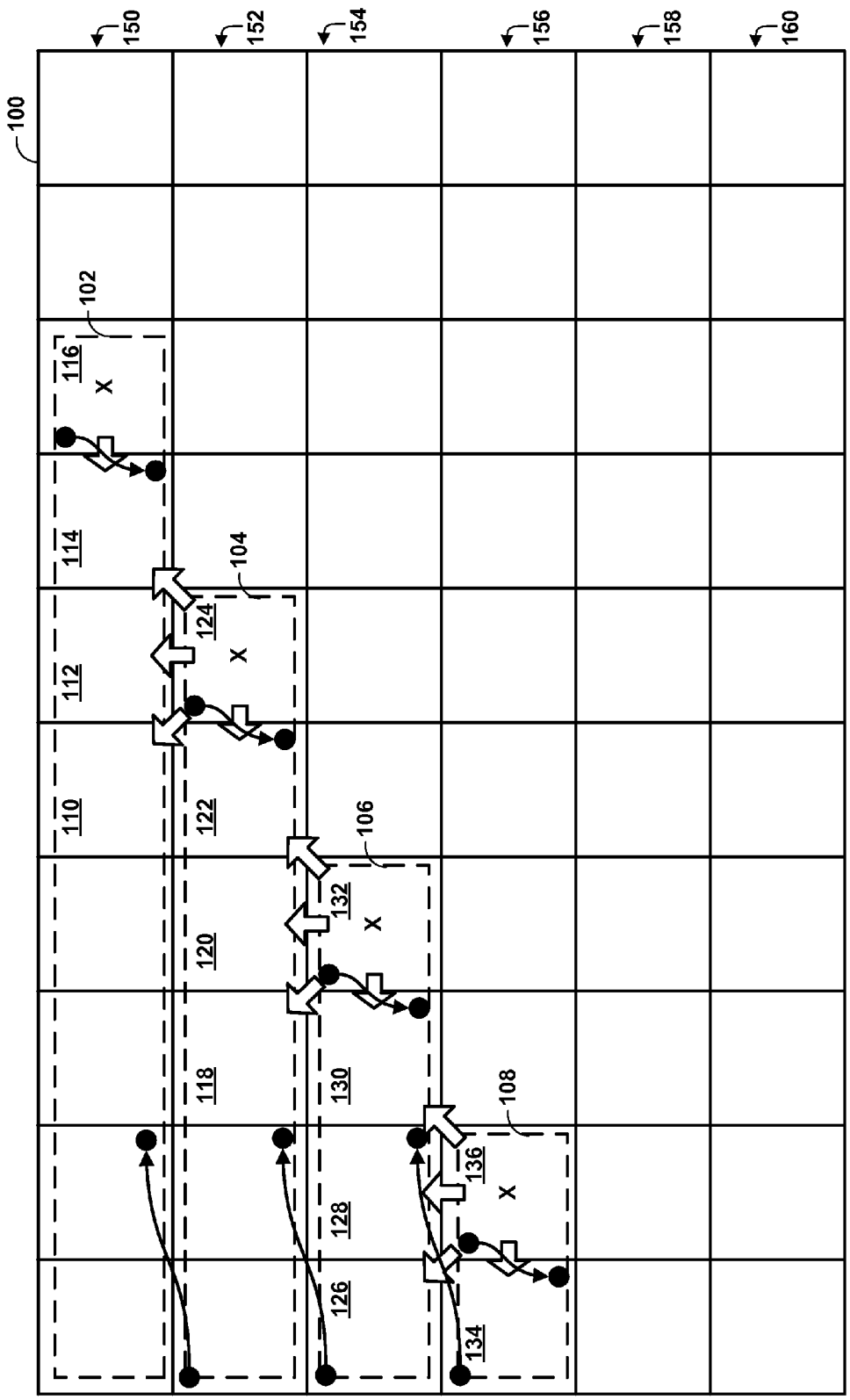
FIG. 2 is a conceptual diagram illustrating an example picture divided into wavefronts.

FIG. 2 is a conceptual diagram illustrating an example picture 100 divided into wavefronts 150-160. Each of wavefronts 150-160 includes a number of blocks. It should be noted that picture 100 may include additional wavefronts, and that each wavefront may include additional blocks than those shown. Each of the blocks may correspond to, for example, an LCU.

A video coder, such as video encoder 20 or video decoder 30, may be configured to code wavefronts 150-160 in parallel. Video encoder 20 may begin coding a wavefront after two blocks of the above wavefront have been coded. FIG. 2 illustrates the blocks after which a wavefront may be coded using black dots connected by a relatively horizontal curved arrow. For example, block 134 of wavefront 156 may be coded after block 128 of wavefront 154 has been coded. As an example, a video coder may code each of the blocks marked with an "X," that is, blocks 116, 124, 132, and 136, in parallel. Dashed lines 102, 104, 106, and 108 represent blocks that have been parsed and from which information is available for retrieval at a particular coding time, in the example of FIG. 2. The particular coding time may correspond to the time at which the blocks marked with an "X," that is, blocks 116, 124, 132, and 136, are coded.

Accordingly, the video coder may retrieve context information for a block marked with an "X" from the blocks pointed to by solid white arrows in FIG. 2. As shown in FIG. 2, each of the blocks to which a solid white arrow points is within one of dashed lines 102, 104, 106, and 108. For example, a video coder may retrieve context information for block 116 from block 114; the video coder may retrieve context information for block 124 from blocks 110, 112, 114, and/or 122; the video coder may retrieve context information for block 132 from blocks 118, 120, 122, and/or 130; and the video coder may retrieve context information for block 136 from blocks 126, 128, 130, and/or 134.

In accordance with the techniques of this disclosure, each of wavefronts 150-160 may include one or more slices. Alternatively, a slice may include one or more complete wavefronts, such as one or more of wavefronts 150-160. For example, a first slice may include blocks of wavefronts 150 and 152, a second slice may include blocks of wavefronts 154 and 156, and a third slice may include blocks of wavefronts 158 and 160. In this manner, when a slice crosses a boundary between two wavefronts, the slice may include all blocks of the two wavefronts.

In this manner, when coding a block at a particular position, the coding scheme described herein can ensure that all data needed for coding the block, e.g., using CABAC, is available. Suppose, for example, that a video coder is to code block 132. In order to initialize a context state for wavefront 154, which includes block 132, a video coder may need one or more parameters of a slice header for a slice including block 132. If the slice were permitted to begin at a block in the middle of wavefront 152 and cross the boundary between wavefront 152 and wavefront 154, the video coder may need to wait to code the first block in the slice to retrieve the information of the slice header. For example, if the slice were to begin at the horizontal position of the block in wavefront 152 below block 116, this block would not yet have been parsed, and thus, the video coder would need to wait until the block was parsed before the video coder could begin coding wavefront 154. However, in one or more examples of this disclosure, a slice may be required to include one or more complete wavefronts, or a wavefront may be required to include one or more complete slices. Thus, a situation of coding delay may be reduced or prevented from occurring.

In this manner, a video coder may safely code a first block of a first wavefront of a picture of video data, wherein the first block has a horizontal position of X+N, where X and N are integers, prior to coding a second block of the first wavefront, the second block having a horizontal position of X+K, wherein K>N and wherein K is an integer, determine one or more slice parameters of a slice including a third block of a second wavefront, the third block having a horizontal position of X, wherein the second wavefront is below the first wavefront, initialize a context for the second wavefront based at least in part on the one or more slice parameters, and code the third block of the second wavefront based on a current context for the second wavefront, wherein coding the third block comprises coding the third block substantially in parallel with a fourth block of the first wavefront, the fourth block having a horizontal position less than X+K.

As an example, suppose that the video coder codes block 124 of wavefront 152. Let block 132 represent a block at a horizontal position of X in wavefront 154. In this example, block 124 would represent a block at a horizontal position of X+2 (e.g., X+N where N=2). Blocks to the right of block 124 (outside of dashed line 104) in wavefront 152 represent examples of blocks having a horizontal position of X+K where K>N. In accordance with the techniques of this disclosure, a slice including block 132 would either begin at the beginning of wavefront 154 or would include all blocks (including block 124) of wavefront 152. In either case, the video coder will have determined one or more slice parameters of the slice including block 132 prior to coding block 132. Therefore, the video coder may initialize a context for wavefront 154 based at least in part on the one or more slice parameters. Initialization of the context for wavefront 154 may also be based on data of the blocks in wavefront 152 above blocks 126 and 128. Moreover, the video coder may code block 132 based on a current context. In this example, the current context for wavefront 154 would be determined after coding blocks 126, 128, and 130. As an alternative example, the video encoder may code block 126 based on the initialized context for wavefront 154.

Tiles offer rectangular partitioning (with CTB granularity) of a picture into multiple independently decodable (including parsing and reconstruction) regions. Every tile's bitstream entry point is signaled in the slice header, preceding the tile data in the same coded NAL unit.

Figure 3:
FIG. 3 is a conceptual diagram showing tiles of a frame.

FIG. 3 is a conceptual diagram showing example tiles of a frame. Frame 160 may be divided into multiple largest coding units (LCUs) 161. Two or more LCUs may be grouped into a rectangular-shaped tiles. When tile-based coding is enabled, coding units within each tile are coded (i.e., encoded or decoded) together before coding subsequent tiles. As shown for frame 160, tiles 162 and 163 are oriented in a horizontal manner and have both horizontal and vertical boundaries. As shown for frame 170, tiles 172 and 173 are oriented in a vertical manner and have both horizontal and vertical boundaries.

Figure 4:
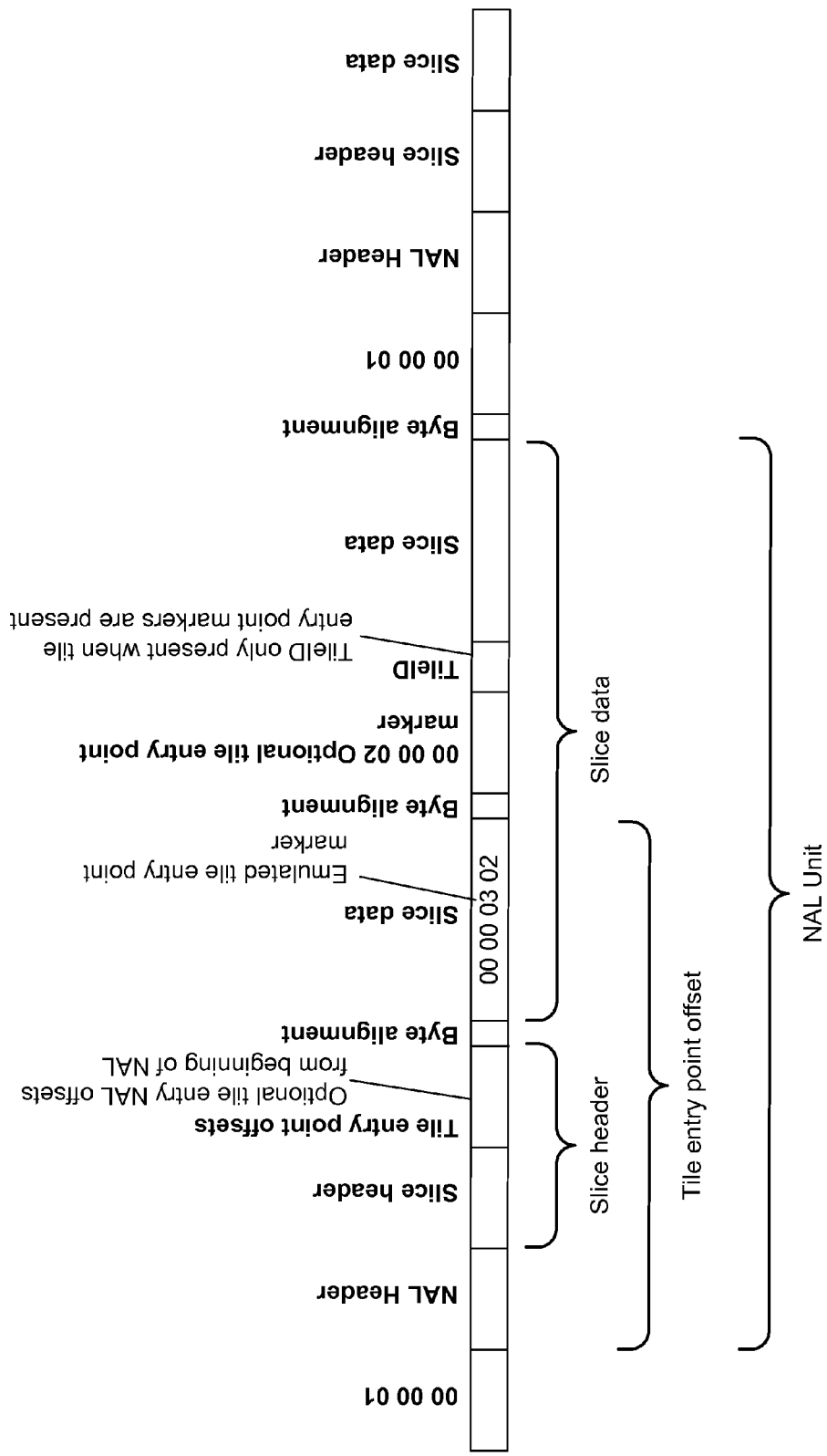
FIG. 4 is a conceptual diagram that illustrates an example bitstream.

FIG. 4 is a conceptual diagram that illustrates an example bitstream with tiles. In some examples, a video encoder may divide the CUs of a slice among smaller groupings. Such groupings may be referred to as "sub-streams" or "sub-slices." The video encoder may divide the CUs of a slice into various types of sub-streams. For example, the video encoder may divide the CUs of a slice into a plurality of tiles. The video encoder may divide the CUs into tiles by defining two or more horizontal boundaries for a picture and two or more vertical boundaries for the picture. The horizontal boundaries may include the top and bottom edges of the picture. The vertical boundaries may include the left and right sides of the picture. When the video encoder does not use tiles, the video encoder may encode all of the treeblocks of the frame in raster scan order. However, when the video encoder uses tiles, the video encoder may encode the tiles in raster scan order. When the video encoder encodes a tile, the video encoder may encode the treeblocks (i.e., LCUs) within the tile in raster scan order. Thus, the video encoder may use tiles to change the encoding order of the treeblocks of the picture.

Furthermore, in some instances, when the video encoder is encoding a given CU, the video encoder may only use information associated with CUs in the same tile as the given CU to perform intra or inter prediction on the given CU. Similarly, in some instances, when the video encoder is encoding a given CU, the video encoder may only use information associated with CUs in the same tile as the given CU to select a context for entropy encoding a syntax element of the given CU. Because of these restrictions, the video encoder may be able to encode two or more of the tiles in parallel.

A coded slice NAL unit associated with a given slice may include encoded data associated with each of the tiles of the given slice. For example, the coded slice NAL unit may include encoded syntax elements associated with each of the tiles. To parse or decode multiple sub-streams of the slice in parallel, a video decoder may need to determine the locations within the coded slice NAL unit of the encoded syntax elements associated with the tiles. In other words, the video decoder may need to determine the "entry points" of the tiles. For example, the decoder may need to determine where the encoded syntax elements associated with a first tile start, where the encoded syntax elements associated with a second tile start, and so on.

In the HEVC WD7 specification, tile entry points are signaled in two or more different ways. A first one of these ways is the use of entry point NAL unit offsets relative to the previous entry point starting from the beginning of the NAL unit. Another way to code tile entry points may use tile start code markers (entry_point_marker_two_3 bytes=0x000002) at byte aligned positions before the start of each tile (except for the first tile starting with the slice header). Also, when tile start code markers are used, a tile_idx_minus1 syntax element is signaled as TileID. In the HEVC WD7 specification, it may not be necessary for each tile to have a signaled entry point. There might be more tiles than the number of signaled entry points (considering the first tile in a slice has an implicitly signaled entry point).

The HEVC WD7 specification allows existence of both types of signaling at the same time or separately. Also, when both methods are used at the same time, the two ways of entry points signaling do not have to be aligned. This means that a bitstream can have a first tile whose entry point is only signaled with an entry point marker, a second tile whose entry point is only signaled with an entry point offset, a third tile whose entry point is signaled by both an entry point marker and an entry point marker, and a fourth tile whose entry point is not signaled.

In the HEVC WD7 specification, co-existence of tiles and wavefronts is not supported. However, there might be cases where co-existence of tiles and wavefronts may be useful. For such cases, this disclosure describes a simple, restricted scheme to support both tiles and wavefront parallel processing in the HEVC framework.

In the HEVC WD7 specification the presence of tiles or WPP is signaled in the picture parameter set as shown below in TABLE 1. In TABLE 1, as well as the other tables in this disclosure, the Descriptor column identifies how many bits are used for a particular syntax element. For example, the descriptor "u(2)" indicates two bits, the descriptor "u(4)" indicates four bits, and so on. The descriptor "ue(v)" indicates the number of bits is variable, and a decoder implements entropy decoding to interpret the syntax element.

TABLE 1

7.3.2.3 Picture parameter set RBSP syntax

| pic_parameter_set_rbsp( ) { | Descriptor |
|---|---|
| ..... | ue(v) |
| tiles_or_entropy_coding_sync_idc | u(2) |
| if( tiles_or_entropy_coding_sync_idc = = 1 ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width[ i ] | ue(v) |
|     for( i = 0; i < num_tile_rows_minus1; i++ ) | |
|       row_height[ i ] | ue(v) |
|   } | |
|   loop_filter_across_tiles_enabled_flag | u(1) |
| } else if( tiles_or_entropy_coding_sync_idc = = 3 ) | |
|   cabac_independent_flag | u(1) |
| deblocking_filter_control_present_flag | u(1) |
| ...... | |

As introduced above, the syntax element "tiles_or_entropy_coding_sync_idc" is a two-bit syntax element that can have four possible values. The two bit syntax element is used to identify one of four possible scenarios—1) WPP is enabled, 2) tiles are enabled, 3) entropy slices are enabled, or 4) none of 1-3 are enabled. More than one of WPP, tiles, and entropy slices cannot be enabled using the syntax shown in TABLE 1.

Also in the slice header, the entry points for tiles and wavefronts are signaled as shown below in TABLE 2.

TABLE 2

7.3.3 Slice header syntax

| slice_header( ) { | Descriptor |
|---|---|
| .... | u(1) |
| if( tiles_or_entropy_coding_sync_idc = = 1 \|\| | |
|   tiles_or_entropy_coding_sync_idc = = 2 ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset[ i ] | u(v) |
|   } | |
| } | |
| ..... | |

In HEVC WD7, because co-existence of tiles and WPP is not supported, there is no ambiguity in the types of entry points signaled in the slice header. If the presence of tiles is signaled in the picture parameter set (PPS), then the entry points in the slice header are known to be tile entry points. If WPP is signaled in the PPS, then the entry points are known to be WPP entry points.

If co-existence of tiles and wavefront is to be enabled, then a simple way to support both parallelism mechanisms is to have tiles start a new slice (with a slice header) if both tiles and WPP exist in a picture, and to have each wavefront within a tile. If co-existence of tiles and WPP is not present, then such a restriction need not be imposed, and the existing restrictions of HEVC WD7 may be implemented. If both tiles and WPP are present in a picture, then the techniques of this disclosure include having wavefronts be present within tiles and preventing a wavefront from spanning across tiles. Thus, the entry points signaled in the slice header can be the WPP entry points if both tiles and wavefronts co-exist in a picture. If only one of tiles and WPP is present in a picture, then the entry points signaled in the slice header may correspond to either tiles or WPP as indicated in the PPS, same as in the HEVC WD7 specification.

Figure 5:
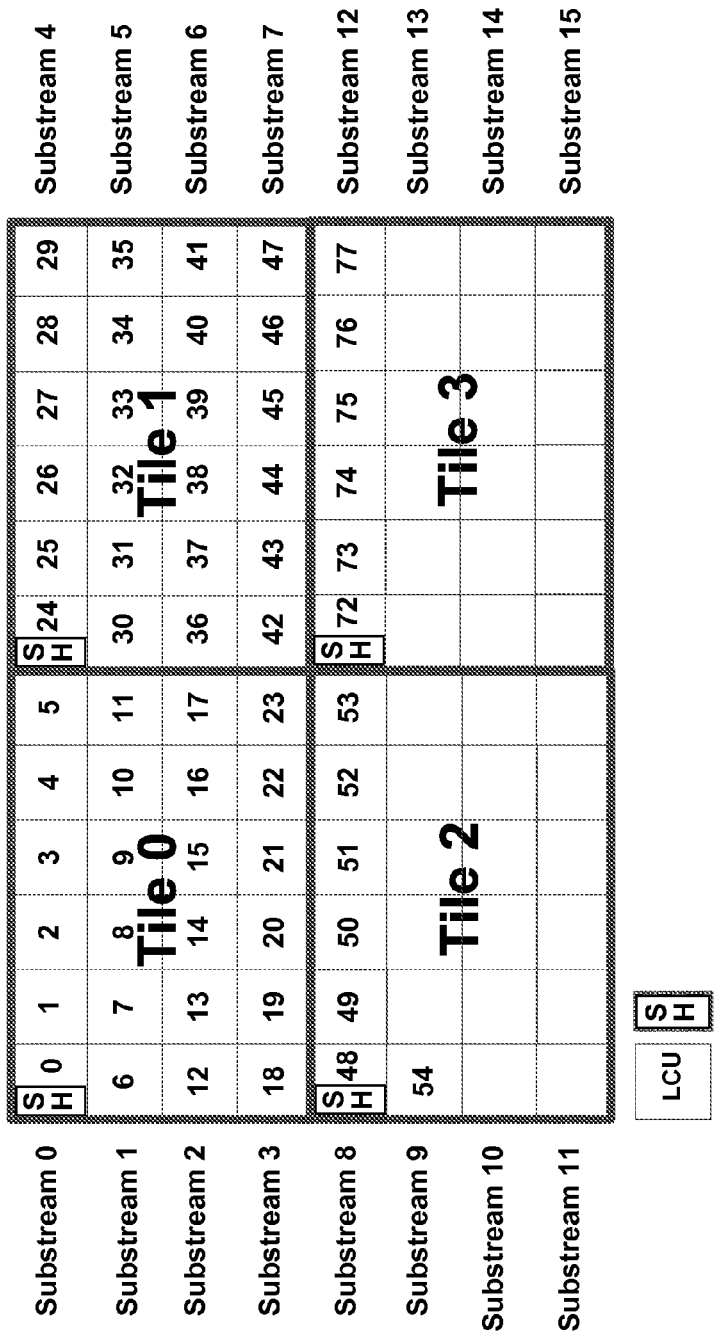
FIG. 5 shows a conceptual diagram illustrating the co-existence of tiles and wavefront parallel processing (WPP) according to the techniques of this disclosure.

FIG. 5 illustrates a proposed scheme for the co-existence of tiles and WPP in accordance with the techniques of this disclosure. FIG. 5 shows picture 501, and picture 501 includes four tiles labeled Tile 0, Tile 1, Tile 2, and Tile 3. Picture 501 is also divided into four slices, with each slice having a slice header (SH). As can be seen in the example of FIG. 5, each tile corresponds to a slice. Thus, the start of each tile also starts a new slice.

FIG. 5 also shows sixteen WPP streams co-existing within picture 501. The sixteen WPP streams are labeled Substream 0 through Substream 15. As shown in FIG. 5, each tile includes four WPP streams. For example, Tile 0 includes substreams 0 through 3; Tile 1 includes substreams 4 through 7; Tile 2 includes substreams 8 through 11; and Tile 3 includes substreams 12 through 15. Each substream includes six LCUs. For example, substream 0 includes LCUs 0 through 5; substream 4 includes LCUS 24 through 29; substream 8 includes LCUs 48 through 53, and so on. In order to simplify the illustration, not all LCUs in FIG. 5 are labeled. As shown in FIG. 5 wavefronts (e.g. the substreams) are present within tiles and do not span across multiple tiles. For example, the LCUs that comprise substream 2 are all LCUs that are all within Tile 0; the LCUs that comprise substream 7 are all LCUs that are within Tile 1, and so on.

An example of the proposed syntax to support both tiles and WPP can be described by the following modified PPS and slice header syntax shown in TABLES 3 and 4, respectively.

TABLE 3

7.3.2.3 Picture parameter set RBSP syntax

| pic_parameter_set_rbsp( ) { | Descriptor |
|---|---|
| ..... | ue(v) |
| parallelism_idc | u(3) |
| entropy_coding_sync_enabled_flag u(1) = wavefront | |
| if( ( parallelism_idc & 0x1 ) = = 1 ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width[ i ] | ue(v) |
|     for( i = 0; i < num_tile_rows_minus1; i++ ) | |
|       row_height[ i ] | ue(v) |
|   } | |
|   loop_filter_across_tiles_enabled_flag | u(1) |
| } else if( parallelism_idc = = 4 ) | |
|   cabac_independent_flag | u(1) |
| deblocking_filter_control_present_flag | u(1) |
| ...... | |

TABLE 4

7.3.3 Slice header syntax

| slice_header( ) { | Descriptor |
|---|---|
| .... | u(1) |
| if(parallelism_idc & 0x3 ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset[ i ] | u(v) |
|   } | |
| } | |
| ..... | |

The "parallelism_idc" syntax element of TABLE 3 will now be described. This syntax element indicates the possible presence of tiles, wavefronts, or entropy slices in a picture referring to the picture parameter set. The least significant bit (bit 0) of this syntax element equal to 1 specifies that there may be more than one tile in the picture, and this bit equal to 0 specifies that there are not more than one tile in the picture. Bit 1 of this syntax element equal to 1 specifies that wavefronts may be present, and this bit equal to 0 specifies that wavefronts are not present. Bit 2 of this syntax element equal to 1 specifies that entropy slices may be present, and this bit equal to 0 specifies that entropy slices are not present. When bit 0 or bit 1 of the syntax element is equal to 1, bit 2 of the syntax element shall be equal to 0.

Although shown as a three-bit syntax element in Table 3, the "parallelism_idc" syntax element may essentially comprise three separate 1-bit syntax elements, with the first bit indicating if tiles are enabled, the second bit indicating if WPP is enabled, and the third bit indicating if entropy slices are enabled. For coding schemes where multiple parallel processing mechanisms cannot be simultaneously enabled, one of the three bits can be a 1 with the 1 identifying which parallel processing scheme is enabled. For example, a value of 100 for the "parallelism_idc" syntax element can signify tiles are enabled. A value of 010 the "parallelism_idc" syntax element can signify WPP is enabled, and a value of 001 the "parallelism_idc" syntax element can signify that entropy slices are enabled. A value of 000 for the "parallelism_idc" syntax element can signify none of tiles, WPP, and entropy slices are enabled. In this manner, the signaling techniques of this disclosure are compatible with coding standards that only allow for one parallel processing mechanism to be implemented at a time.

The signaling techniques of this disclosure, however, are also compatible with a potential future coding standard allows for more than one parallel processing mechanism to be implemented simultaneously. For example, should tiles and WPP be implemented simultaneously, a value of 110 for the "parallelism_idc" syntax element may be used, where the 1 of the first bit indicates tiles are enabled and the 1 of the second bit indicates WPP is enabled. Signaling that both tiles and WPP are enabled still only takes three bits, as does signaling that only one of tiles and WPP is enabled. Therefore, the amount of redesign that would be necessary to make a video coder capable of parsing a parameter set where both tiles and WPP are capable of being enabled simultaneously would be minimal.

As can be seen by comparing TABLES 2 and 4, the syntax elements used to signal entry points for the techniques of this disclosure do not change, but how a video decoder interprets those syntax elements may change. For example, according to techniques of this disclosure, if both tiles and WPP are enabled in a picture, then the video coder can interpret the entry points signaled in the slice headers as WPP entry points. If only one of tiles and WPP are enabled in a picture, then the entry points signaled in the slice header can correspond to either tiles or WPP as indicated in the PPS as in the HEVC WD7 specification. For example, in response to only tiles being enabled, video decoder 30 can interpret entry points signaled in a slice header as corresponding to tile entry points, and in response to only WPP being enabled, video decoder 30 can interpret the entry points signaled in the slice header as corresponding to WPP entry points.

Figure 6:
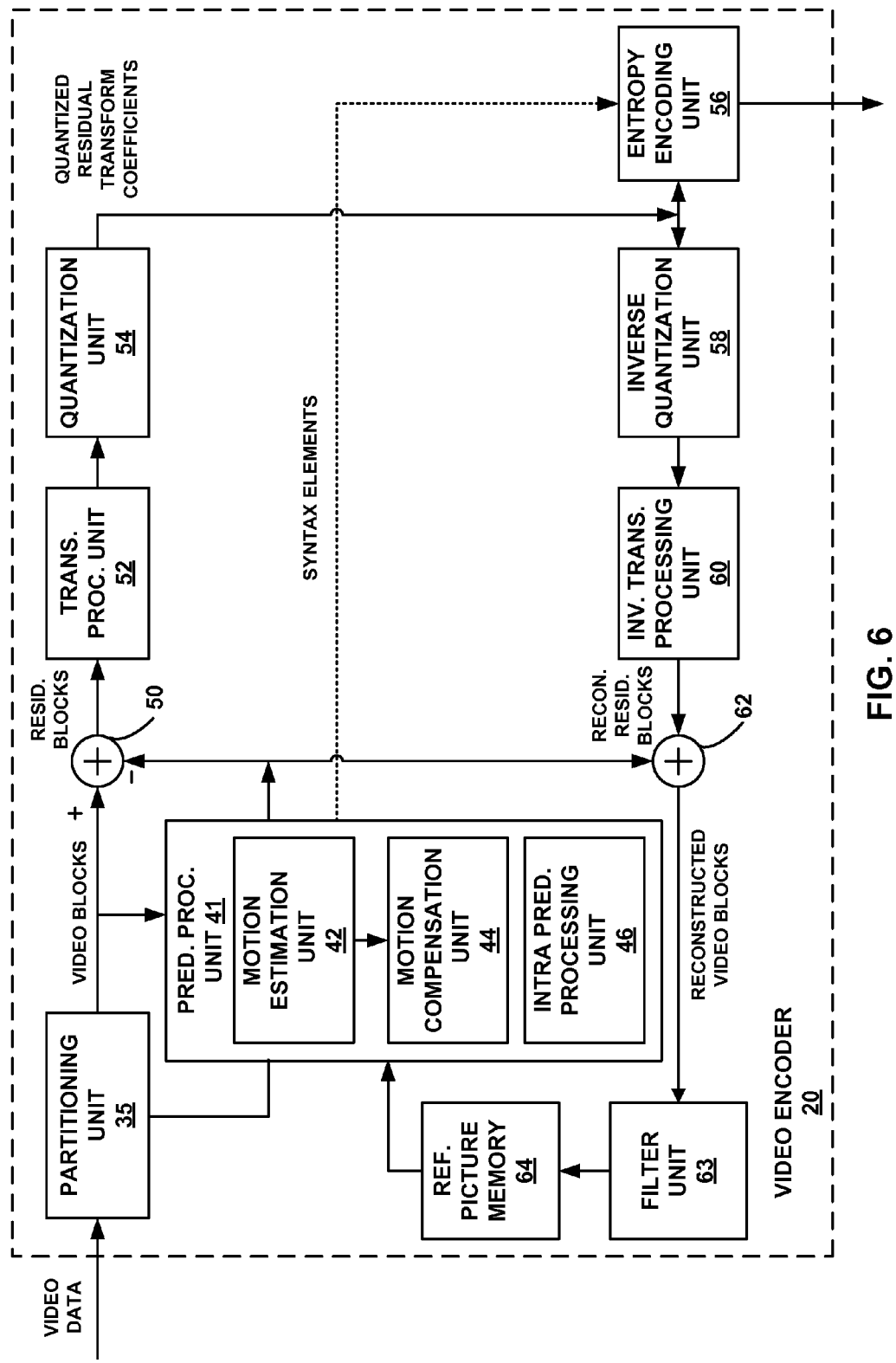
FIG. 6 is a block diagram illustrating an example video encoder that may implement the techniques described in this disclosure.

FIG. 6 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes a partitioning unit 35, prediction processing unit 41, filter unit 63, reference picture memory 64, summer 50, inverse transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter.

As shown in FIG. 6, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

As described above, video encoder 20 can be configured to implement the techniques of this disclosure, including techniques that may allow for multiple parallel processing mechanisms to be implemented simultaneously. Video encoder 20 of FIG. 6 may, for example, generate for inclusion in an encoded bitstream the "parallelism_idc" syntax element described above. When video data is coded using more than one parallel processing mechanism, video encoder 20 of FIG. 6 may also code the video data using one or more of the various restrictions described in this disclosure to enable a video decoder to properly parse parameter set and slice header data. For example, video encoder 20 may encode video data such that wavefronts are present entirely within tiles and do not span across multiple tiles. Additionally when coding a plurality of tiles, video encoder 20 may encode the plurality of tiles such that each tile starts a new slice and each new slice has a corresponding slice header.

In this manner, video encoder 20 of FIG. 6 represents an example of a video encoder configured to generate one or more first bits in a parameter set that indicate whether tiles are enabled for a series of video blocks and generate one or more second bits in the parameter set that are different from the one or more first bits and that indicate whether WPP is enabled for the series of video blocks. The generated bits can be included in a coded bitstream of video data.

Figure 7:
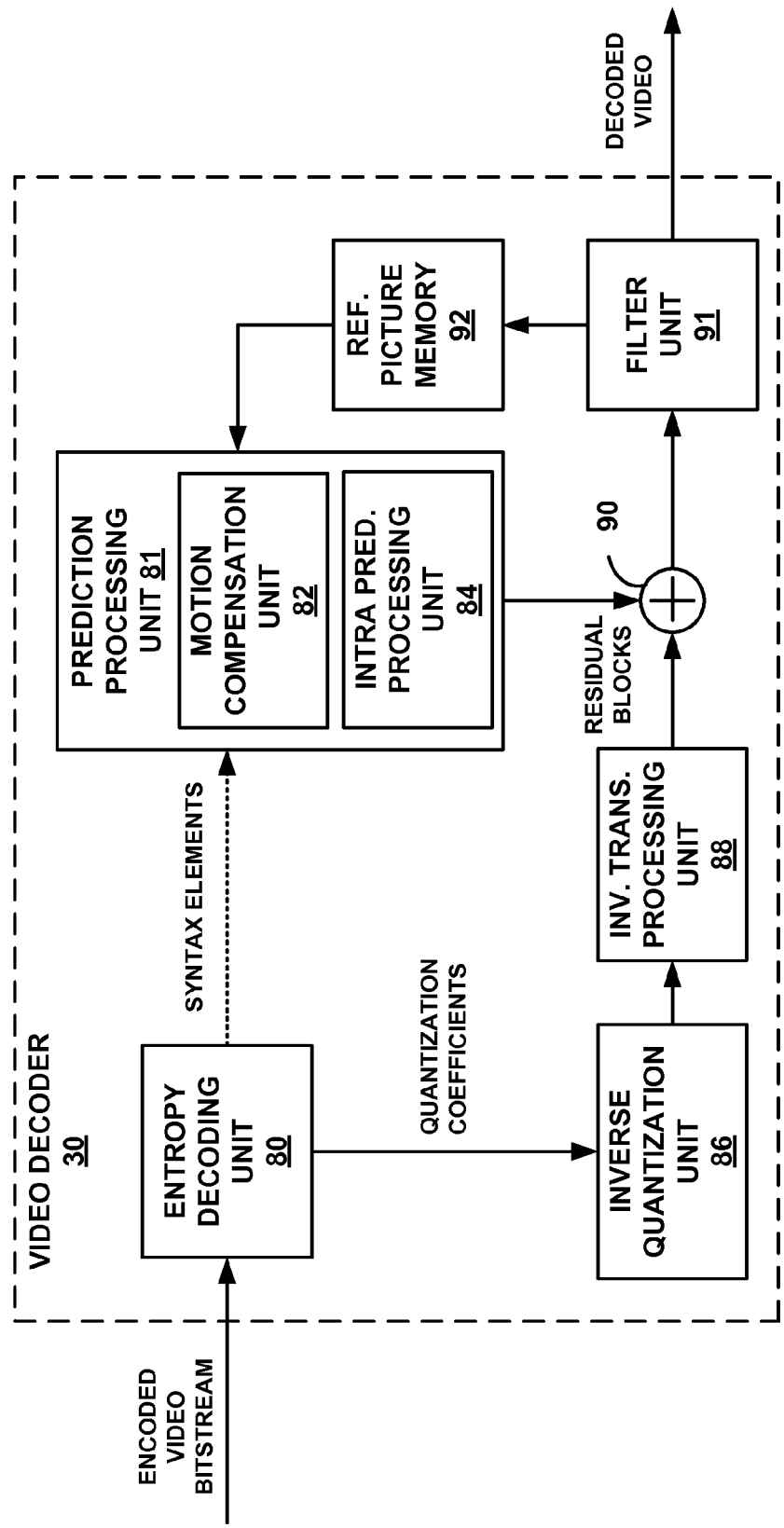
FIG. 7 is a block diagram illustrating an example video decoder that may implement the techniques described in this disclosure.

FIG. 7 is a block diagram illustrating an example video decoder 30 that may implement the techniques described in this disclosure. In the example of FIG. 7, video decoder 30 includes an entropy decoding unit 80, prediction processing unit 81, inverse quantization unit 86, inverse transformation unit 88, summer 90, filter unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 6.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 5 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 of FIG. 7 represents an example of a video decoder configured to receive a parameter set comprising one or more first bits and one or more second bits, wherein the one or more first bits indicate whether tiles are enabled for a series of video blocks, wherein the one or more second bits are different from the one or more first bits, and wherein the one or more second bits indicate whether wavefront parallel processing (WPP) is enabled for the series of video blocks; and, decode the series of video blocks based on the parameter set. Video decoder 30 can decode the series of video blocks using both tiles and WPP. Video decoder 30 can be configured to parse a bitstream where wavefronts are present entirely within tiles and where wavefronts do not span across multiple tiles. The series of video blocks can include a plurality of tiles, and each tile can start a new slice with each new slice having a corresponding slice header.

Video decoder 30 can also receive WPP entry points signaled in a slice header. Video decoder 30 may, for example, receive, for a second series of video blocks, a parameter set indicating that only one of tiles and WPP is enabled for a picture, and in response to only tiles being enabled, interpret entry points signaled in a slice header as corresponding to tile entry points and in response to only WPP being enabled, interpret the entry points signaled in the slice header as corresponding to WPP entry points.

Figure 8:
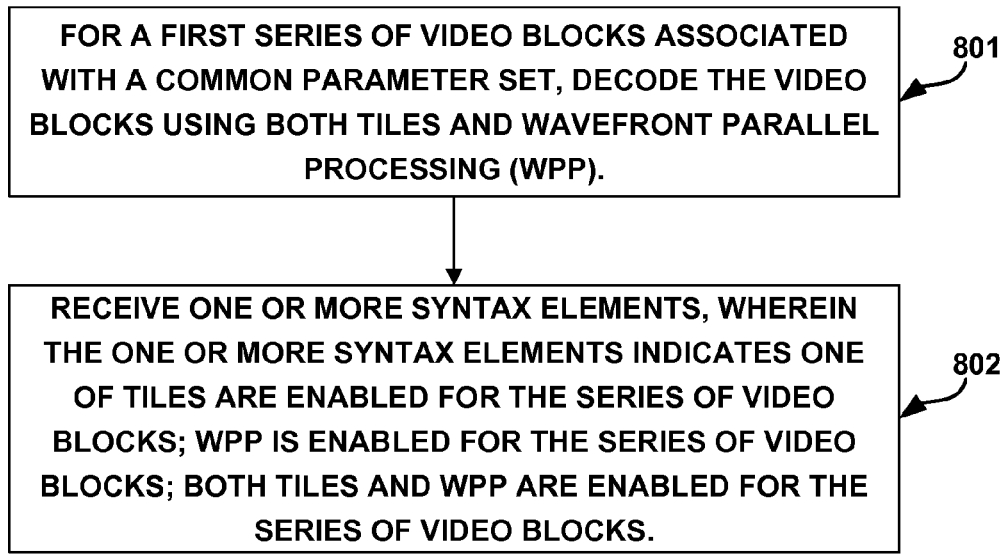
FIG. 8 is a flowchart illustrating techniques of this disclosure.

FIG. 8 is a flowchart illustrating an example technique of this disclosure. FIG. 8 will be described with reference to video decoder 30, although the method could be performed by other types of decoders or other devices. For a first series of video blocks associated with a common parameter set, video decoder 30 decodes the video blocks using both tiles and WPP (801). The common parameter set may comprise a picture parameter set. Video decoder 30 receives one or more syntax elements (802) which indicate whether one of tiles are enabled for the series of video blocks, whether WPP is enabled for the series of video blocks, and whether both tiles and WPP are enabled for the series of video blocks.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, by a video decoder, a parameter set comprising a first bit and a second bit, the first bit indicating whether tiles are enabled for a picture referring to the parameter set, the second bit being different from the first bit, and the second bit indicating whether wavefront parallel processing (WPP) is enabled for the picture, wherein:
      based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and
      based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and
   based on the first bit indicating tiles are enabled for the picture and the second bit indicating WPP is enabled for the picture, decoding, by the video decoder, the picture using both a plurality of tiles and WPP, wherein:
      a slice header of a slice of the picture comprises a plurality of entry points, and
      based on both tiles and WPP being enabled for the picture, each respective entry point that is signaled in the slice header is a WPP entry point that signals a start of a respective wavefront, and wavefronts are restricted from spanning across multiple tiles.

2. The method of claim 1, wherein the parameter set is a picture parameter set.

3. The method of claim 1, wherein each respective tile of the plurality of tiles starts a respective slice of the picture, the respective slice having a corresponding slice header.

4. The method of claim 1, wherein the parameter set is a first parameter set, the method further comprising:
   receiving, by the video decoder, a second parameter set, the second parameter set indicating that only one of tiles and WPP is enabled for a second picture;
   in response to only tiles being enabled for the second picture, interpreting, by the video decoder, entry points signaled in a slice header of a slice of the second picture as tile entry points; and
   in response to only WPP being enabled for the second picture, interpreting, by the video decoder, the entry points signaled in the slice header of the slice of the second picture as WPP entry points.

5. A device for decoding video data, the device comprising:
   a storage medium configured to store the video data; and
   a video decoder implemented as circuitry or a combination of circuitry and software, the video decoder configured to:
      receive a parameter set comprising a first bit and a second bit, the first bit indicating whether tiles are enabled for a picture referring to the parameter set, the second bit being different from the first bit, and the second bit indicating whether wavefront parallel processing (WPP) is enabled for the picture, wherein:
         based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and
         based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and based on the first bit indicating tiles are enabled for the picture and the second bit indicating WPP is enabled for the picture, decode the picture using both a plurality of tiles and WPP, wherein a slice header of a slice of the picture comprises a plurality of entry points, and wherein based on both tiles and WPP being enabled for the picture, each respective entry point that is signaled in the slice header is a WPP entry point that signals a start of a respective wavefront, and wavefronts are restricted from spanning across multiple tiles.

6. The device of claim 5, wherein the parameter set is a picture parameter set.

7. The device of claim 5, wherein each respective tile of the plurality of tiles starts a respective slice of the picture, the respective slice having a corresponding slice header.

8. The device of claim 5, wherein the parameter set is a first parameter set, the video decoder is further configured to:

receive a second parameter set, the second parameter set indicating that only one of tiles and WPP is enabled for a second picture;

in response to only tiles being enabled for the second picture, interpret entry points signaled in a slice header of a slice of the second picture as tile entry points; and in response to only WPP being enabled for the second picture, interpret the entry points signaled in the slice header of the slice of the second picture as WPP entry points.

9. The device of claim 5, wherein the device comprises at least one of:

an integrated circuit;
a microprocessor; and,
a wireless communication device that comprises the video decoder.

10. The device of claim 5, further comprising a display configured to display the decoded video data.

11. A device for decoding video data, the device comprising:

means for receiving a parameter set comprising a first bit and a second bit, the first bit indicating whether tiles are enabled for a picture referring to the parameter set, the second bit being different from the first bit, and the second bit indicating whether wavefront parallel processing (WPP) is enabled for the picture, wherein:

based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and based on the first bit indicating tiles are enabled for the picture and the second bit indicating WPP is enabled for the picture, means for decoding the picture using both a plurality of tiles and WPP, wherein a slice header of a slice of the picture comprises a plurality of entry points, and wherein based on both tiles and WPP being enabled for the picture, each respective entry point that is signaled in the slice header is a WPP entry point that signals a start of a respective wavefront, and wavefronts are restricted from spanning across multiple tiles.

12. The device of claim 11, wherein the parameter set is a picture parameter set.

13. The device of claim 11, wherein each respective tile of the plurality of tiles starts a respective slice of the picture, the respective slice having a corresponding slice header.

14. The device of claim 11, wherein the parameter set is a first parameter set, the device further comprising:

means for receiving a second parameter set, the second parameter set indicating that only one of tiles and WPP is enabled for a second picture;

means for interpreting entry points signaled in a slice header of a slice of the second picture as tile entry points in response to only tiles being enabled for the second picture; and means for interpreting the entry points signaled in the slice header of the slice of the second picture as WPP entry points in response to only WPP being enabled for the second picture.

15. A computer-readable storage medium storing instructions that when executed by one or more processors cause the one or more processors to:

receive a parameter set comprising a first bit and a second bit, the first bit indicating whether tiles are enabled for a picture referring to the parameter set, the second bit being different from the first bit, and the second bit indicating whether wavefront parallel processing (WPP) is enabled for the picture, wherein:

based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and based on the first bit indicating tiles are enabled for the picture and the second bit indicating WPP is enabled for the picture, decode the picture using both a plurality of tiles and WPP, wherein a slice header of a slice of the picture comprises a plurality of entry points, and wherein based on both tiles and WPP being enabled for the picture, each respective entry point that is signaled in the slice header is a WPP entry point that signals a start of a respective wavefront, and wavefronts are restricted from spanning across multiple tiles.

16. The computer-readable storage medium of claim 15, wherein the parameter set is a picture parameter set.

17. The computer-readable storage medium of claim 15, wherein each respective tile of the plurality of tiles starts a respective slice of the picture, the respective slice having a corresponding slice header.

18. The computer-readable storage medium of claim 15, wherein the parameter set is a first parameter set, the instructions, when executed, further causing the one or more processors to:
    receive a second parameter set, the second parameter set indicating that only one of tiles and WPP is enabled for a second picture;
    in response to only tiles being enabled for the second picture, interpret entry points signaled in a slice header of a slice of the second picture as tile entry points; and
    in response to only WPP being enabled for the second picture, interpret the entry points signaled in the slice header of the slice of the second picture as WPP entry points.

19. A method of encoding video data, the method comprising:
    generating a first bit in a parameter set, the first bit indicating whether tiles are enabled for a picture referring to the parameter set;
    generating a second bit in the parameter set, the second bit being different from the first bit, and the second bit indicating whether wavefront parallel processing (WPP) is enabled for the picture, wherein:
        based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and
        based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and
    based on the first bit indicating tiles are enabled for the picture and the second bit indicating WPP is enabled for the picture, encoding the picture using both a plurality of tiles and WPP,
        wherein a slice header of a slice of the picture comprises a plurality of entry points, and
        wherein based on both tiles and WPP being enabled for the picture, each respective entry point that is signaled in the slice header is a WPP entry point that signals a start of a respective wavefront, and wavefronts are restricted from spanning across multiple tiles.

20. The method of claim 19, wherein the parameter set is a picture parameter set.

21. The method of claim 19, wherein each respective tile of the plurality of tiles starts a respective slice of the picture, the respective slice having a corresponding slice header.

22. The method of claim 19, wherein the parameter set is a first parameter set, the method further comprising:
    generating a second parameter set, the second parameter set indicating that only one of tiles and WPP is enabled for a second picture;
    generating, in a slice header of a slice of the second picture, syntax elements identifying entry points, wherein:
        when only tiles are enabled for the second picture, the entry points signaled in the slice header of the slice of the second picture are tile entry points, and
        when only WPP is enabled for the second picture, the entry points signaled in the slice header of the slice of the second picture are WPP entry points.

23. A device for encoding video data, the device comprising:
    a storage medium configured to store the video data; and
    a video encoder implemented as circuitry or a combination of circuitry and software, the video encoder configured to:
        generate a first bit in a parameter set, the first bit indicating whether tiles are enabled for a picture referring to the parameter set;
        generate a second bit in the parameter set, the second bit being different from the first bit, and the second bit indicating whether wavefront parallel processing (WPP) is enabled for the picture, wherein:
            based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and
            based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and
        based on the first bit indicating tiles are enabled for the picture and the second bit indicating WPP is enabled for the picture, encode the picture using both a plurality of tiles and WPP,
            wherein a slice header of a slice of the picture comprises a plurality of entry points, and
            wherein based on both tiles and WPP being enabled for the picture, each respective entry point that is signaled in the slice header is a WPP entry point that signals a start of a respective wavefront, and wavefronts are restricted from spanning across multiple tiles.

24. The device of claim 23, wherein the parameter set is a picture parameter set.

25. The device of claim 23, wherein each respective tile of the plurality of tiles starts a respective slice of the picture, the respective slice having a corresponding slice header.

26. The device of claim 23, wherein the video encoder is further configured to:

generate a second parameter set, the second parameter set indicating that only one of tiles and WPP is enabled for a second picture;

generate, in a slice header of a slice of the second picture, syntax elements identifying entry points, wherein:

when only tiles are enabled for the second picture, the entry points signaled in the slice header of the slice of the second picture are tile entry points; and when only WPP is enabled for the second picture, the entry points signaled in the slice header of the slice of the second picture are WPP entry points.

27. The device of claim 23, wherein the device comprises at least one of:

an integrated circuit;

a microprocessor; and, a wireless communication device.

28. The device of claim 23, further comprising a camera configured to capture the video data.

29. A device for encoding video data, the device comprising:

means for generating a first bit in a parameter set, the first bit indicating whether tiles are enabled for a picture referring to the parameter set;

means for generating a second bit in the parameter set, the second bit being different from the first bit, and the second bit indicating whether wavefront parallel processing (WPP) is enabled for the picture, wherein:

based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and based on the first bit indicating tiles are enabled for the picture and the second bit indicating WPP is enabled for the picture, means for encoding the picture using both a plurality of tiles and WPP, wherein a slice header of a slice of the picture comprises a plurality of entry points, and wherein based on both tiles and WPP being enabled for the picture, each respective entry point that is signaled in the slice header is a WPP entry point that signals a start of a respective wavefront, and wavefronts are restricted from spanning across multiple tiles.

30. A computer-readable storage medium storing instruction that when executed by one or more processors cause the one or more processors to:

generate a first bit in a parameter set, the first bit indicating whether tiles are enabled for a picture referring to the parameter set;

generate a second bit in the parameter set, the second bit being different from the first bit, and the second bit indicating whether wavefront parallel processing (WPP) is enabled for the picture, wherein:

based on tiles being enabled for the picture, the parameter set includes a first syntax element, a second syntax element, and a third syntax element, the first syntax element defining a number of columns of tiles of the picture, the second syntax element defining a number of rows of the tiles of the picture, the third syntax element indicating whether spacing of the tiles of the picture is uniform, and based on the third syntax element indicating spacing of the tiles of the picture is not uniform and based on the number of columns of tiles being greater than 1, the parameter set includes a plurality of fourth syntax elements, each respective fourth syntax element of the plurality of fourth syntax elements indicating a width of a respective column of tiles of the picture in units of coding tree blocks, at least one fourth syntax element of the plurality of fourth syntax elements indicating a value greater than 1; and based on the first bit indicating tiles are enabled for the picture and the second bit indicating WPP is enabled for the picture, encode the picture using both a plurality of tiles and WPP, wherein a slice header of a slice of the picture comprises a plurality of entry points, and wherein based on both tiles and WPP being enabled for the picture, each respective entry point that is signaled in the slice header is a WPP entry point that signals a start of a respective wavefront, and wavefronts are restricted from spanning across multiple tiles.

* * * * *